United States Patent
Hogge et al.

(10) Patent No.: US 6,855,070 B2
(45) Date of Patent: Feb. 15, 2005

(54) INFRARED HEATING METHOD FOR CREATING CURE GRADIENTS IN GOLF BALLS AND GOLF BALLS CORES

(75) Inventors: Matthew F. Hogge, Mattapoisett, MA (US); Michael J. Sullivan, Barrington, RI (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 10/141,481

(22) Filed: May 8, 2002

(65) Prior Publication Data

US 2003/0236135 A1 Dec. 25, 2003

(51) Int. Cl.$^7$ ............................ A63B 37/06; B05D 3/06
(52) U.S. Cl. ...................................... 473/351; 427/493
(58) Field of Search .............................. 473/377, 374, 473/373, 372, 378, 351; 264/250

(56) References Cited

U.S. PATENT DOCUMENTS

| | | | |
|---|---|---|---|
| 4,264,075 A | * | 4/1981 | Miller et al. ................ 473/372 |
| 4,570,937 A | | 2/1986 | Yamada ...................... 273/220 |
| 4,650,193 A | | 3/1987 | Molitor et al. .............. 273/228 |
| 4,858,924 A | | 8/1989 | Saito et al. .................... 273/62 |
| 5,484,870 A | | 1/1996 | Wu ............................. 528/28 |
| 5,665,192 A | | 9/1997 | Wolki et al. ................ 156/188 |
| 5,672,393 A | | 9/1997 | Bachmann et al. ......... 427/493 |
| 5,677,362 A | | 10/1997 | Bachmann et al. ........... 522/28 |
| 5,692,974 A | | 12/1997 | Wu et al. .................... 473/377 |
| 5,697,856 A | | 12/1997 | Moriyama et al. .......... 473/374 |
| 5,703,166 A | | 12/1997 | Rajagopalan et al. ....... 525/196 |
| 5,733,206 A | | 3/1998 | Nesbitt et al. .............. 473/377 |
| 5,803,833 A | * | 9/1998 | Nakamura et al. .......... 473/377 |
| 5,803,834 A | | 9/1998 | Yamagishi et al. ......... 473/377 |
| 5,824,746 A | | 10/1998 | Harris et al. ................ 525/196 |
| 5,908,358 A | | 6/1999 | Wu ............................. 473/378 |
| 5,976,443 A | | 11/1999 | Nesbitt et al. .............. 264/250 |
| 5,981,658 A | | 11/1999 | Rajagopalan et al. ......... 525/72 |
| 6,024,813 A | | 2/2000 | Groeger et al. ............. 156/62.8 |
| 6,056,842 A | | 5/2000 | Dalton et al. ............... 156/243 |
| 6,113,831 A | | 9/2000 | Nesbitt et al. .............. 264/250 |
| 6,150,462 A | | 11/2000 | Rajagopalan et al. ......... 525/74 |
| 6,162,135 A | | 12/2000 | Bulpett et al. .............. 473/373 |
| 6,174,388 B1 | | 1/2001 | Sikka et al. ................. 148/512 |
| 6,193,619 B1 | | 2/2001 | Wu et al. .................... 473/374 |
| 6,210,291 B1 | * | 4/2001 | Kato et al. .................. 473/357 |
| 6,210,294 B1 | | 4/2001 | Wu ............................. 473/377 |
| 6,371,870 B1 | | 4/2002 | Calabria et al. ............. 473/370 |
| 2003/0209840 A1 | * | 11/2003 | Hogge et al. ............... 264/492 |

* cited by examiner

*Primary Examiner*—Glenn Caldarola
*Assistant Examiner*—Tom P Duong
(74) *Attorney, Agent, or Firm*—D. Michael Burns

(57) ABSTRACT

This invention is directed to a golf ball core that has hardness gradients created in its outer skin by the application of high temperatures from infrared radiation. The outer 0.001 to 0.040 inches of the core has a different hardness than the rest of the core. The skin can either be harder or softer than the rest of the core. The core can be compounded by materials that will only be reactive at temperatures produced by infrared radiation.

7 Claims, 1 Drawing Sheet

INFRARED HEATING METHOD FOR CREATING CURE GRADIENTS IN GOLF BALLS AND GOLF BALLS CORES

FIELD OF THE INVENTION

This invention relates to a method of manufacturing a golf ball and a golf ball core having hardness gradients in the outer skin or shell of the core. Specifically, hardness gradients created by infrared radiation.

BACKGROUND OF THE INVENTION

Generally, golf balls have been classified as wound balls or solid balls. Wound balls are generally constructed from a liquid or solid center surrounded by tensioned elastomeric material. Wound balls are generally thought of as performance golf balls and have a good resiliency, spin characteristics and feel when struck by a golf club. However, wound balls are generally difficult to manufacture when compared to solid golf balls.

Solid golf balls were initially, two piece balls, i.e., comprising a core and a cover. More recently developed solid balls are comprised of a core, one or more mantle layers and one or more covers, in order to improve the playing characteristics of the ball.

In the manufacture of solid golf ball cores, all cores have a slight cure gradient. This is a normal result of the cure conditions, which usually heat from the outside in. The current practice is generally to form a core with the most uniformity for the given construction. If it is desired to create cure gradients having large differences, or to use materials that are not typical to the art, generally it has been necessary to use high molding temperatures for long periods of time (i.e. 175° C. for 30 minutes).

The prior art is comprised of a variety of golf balls that have been designed to provide particular playing characteristics. These characteristics are generally the initial velocity and spin of the golf ball, which can be optimized for various types of players. For instance, certain players prefer a ball that has a high spin rate in order to control and stop the golf ball. Other players prefer a ball that has a low spin rate and high resiliency to maximize distance. Generally, a golf ball having a hard core and a soft cover will have a high spin rate. Conversely, a golf ball having a hard cover and a soft core will have a low spin rate. Golf balls having a hard core and a hard cover generally have very high resiliency for distance, but are hard feeling and difficult to control around the greens. Various prior art references have been directed to adding a mantle layer or second cover layer to improve the playability of solid golf balls.

As indicated above, the spin rate of golf balls is the end result of many variables, softness of the cover in relationship to the inner core or an inner mantle layer is but one of these variables. Spin rate is an important characteristic of golf balls for both skilled and recreational golfers. High spin rate allows the more skilled players, such as PGA professionals and low handicapped players, to maximize control of the golf ball. A high spin rate golf ball is advantageous for an approach shot to the green. The ability to produce and control backspin to stop the ball on the green and side spin to draw or fade the ball substantially improves the player's control over the ball. Hence, the more skilled players generally prefer a golf ball that exhibits high spin rate.

On the other hand, recreational players who cannot intentionally control the spin of the ball generally do not prefer a high spin rate golf ball. For these players, slicing and hooking are the more immediate obstacles. When a club head strikes a ball, an unintentional side spin is often imparted to the ball, which sends the ball off its intended course. The side spin reduces the player's control over the ball, as well as the distance the ball will travel. A golf ball that spins less tends not to drift off-line erratically if the shot is not hit squarely off the club face. The low spin ball will not cure the hook or the slice, but the lower spin will reduce the adverse effects of the side spin. Hence, recreational players prefer a golf ball that exhibits low spin rate.

The prior art teaches of having either a soft or a hard mantle layer formed about a core to achieve particular performances, as seen above, from a golf ball. A means of achieving these types of performance characteristics without the use of any mantle layer may be attainable through the use of gradient curing to create hardness gradients on the outer skin or shell of the golf ball core.

U.S. Pat. Nos. 5,803,834, 5,733,206, 5,976,443, 6,113,831, 5,697,856, 4,650,193, 4,570,937, and 4,858,924 are examples of creating gradients in the core of a golf ball.

SUMMARY OF THE INVENTION

One embodiment of the invention provides a golf ball core having a hardness gradient with its outer layer gradient created by infrared radiation curing. The outer layer of the core is of a different hardness than the rest of the core. Preferably, the outer layer being about 0.001 to 0.040 inches thick.

An object of the invention is to form a golf ball wherein the outer layer of a golf ball core is harder or softer than the remainder of the core. Most preferred is a hard layer over a soft core that is accomplished by infrared heating of a pre-molded core. Alternately, a soft skin over a hard core is created by degrading or softening the outer skin of the core by infrared heating. Preferably, the core has a diameter of about 1.50 to 1.65 inches and an Atti compression of less than about 110. More preferably, the core has an Atti compression of less than about 80.

A preferred embodiment of the invention is a golf ball having a core diameter of up to 1.65 inches with a hardness gradient created by infrared radiation such that a thin outer layer of the core has a Shore D hardness greater than 50 and, preferably, greater than 60, with the remainder of the core being at least 3 points softer than the outer layer.

In another embodiment, the invention is a golf ball comprised of a multi-layer core. The core is comprised of a center and at least one layer covering the center, wherein an outer layer is formed, by infrared heating, on the center or one of the layers to form a hardness gradient.

In a preferred embodiment, a soft center is formed then a harder layer is formed over it. An outer layer is then formed on the surface of the harder layer, such that the outer layer is at least 3 Shore D points higher than the harder layer. Preferably, the center has a diameter of about 0.75 to 1.50 inches and the harder layer has an outer diameter of about 1.5 to 1.65 inches. The outer layer preferably has a thickness of about 0.01 to 0.05 inches. Overall, the core preferably has an Atti compression of about 40 to 100.

DESCRIPTION OF THE PREFERRED EMBODIMENTS

Figure 1:
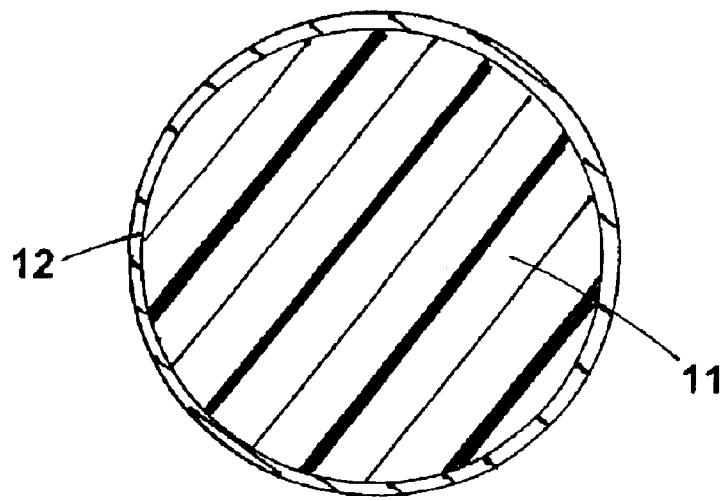
FIG. 1 is a cross section of a one piece core of a golf ball with a skin of the core having a cure gradient created by infrared radiation.

The golf ball of the present invention includes a solid core and a cover. This is the ball we will be prescribing for the purposes of simplicity. The invention would work equally as well with one-piece balls as described in U.S. Pat. No. 6,162,135, multi-layer core balls or a ball made with a laminated construction as described in U.S. Pat. No. 6,056,842, which is incorporated by reference herein in its entirety.

As previously stated, in the manufacture of golf balls, all golf balls have a slight cure gradient that is created by the very nature of the cure conditions, which is heating from the outside in. The cure conditions are optimized to create the core with the most uniformity for the given construction. If cure gradients that have large differences were desired or if materials that are not typical of the art were desired, then they could be achieved with high molding temperatures for long periods of time (i.e. 175° C. for 30 minutes).

The present invention utilizes Infrared Radiation (IR) for creating cure gradients in the golf ball cores. The description herein will only relate to the curing of golf ball cores however, it is appreciated that IR represents a potential alternative means of cross-linking any portion of a ball, including a cover, a coating or any intermediate layer.

The Electromagnetic Spectrum includes all types of radiation: Gamma-rays, X-rays, Ultraviolets, visible light, infrared light, microwaves and radio waves. All these rays and waves in the Electromagnetic Spectrum are different only because the length of their waves are different. Short wavelength radiation is of the highest energy and can be very dangerous (X-rays and Ultraviolets). Longer wavelength radiation, which includes IR, is of lower energy and usually is harmless. IR radiation is a very radiant form of heating. It heats objects and people directly, without the need to heat up the air in between. The prefix "infra" is Latin for below and refers to the wavelengths that are below the red end of the visible spectrum. IR radiation is generally split into three wavelengths: short-wave, medium-wave and long-wave. The wavelengths can vary from 0.7 microns to about 100 microns. For each of these types of infra-red there is a wide choice of emitter and wavelength. Selection of the correct type for a particular application is usually critical. The type of wavelength employed in the present invention is the medium-length wherein the emitter operates at bright red heat. The absorption wavelengths of C=C groups which include butadiene is about 6.07 microns. The absorption range for most of the materials reported in this invention fall between about 5 to 6.8 microns. The type of emitter to provide IR in this range are well known by those in the field and medium-wave panels can be easily retro-fitted to existing hot air or contra-flow ovens. The following U.S. Pat. Nos. 6,174,388, 6,024,813, 5,677,362, 5,672,393, and 5,665,192, which are incorporated by reference herein in their entirety, describe various methods of curing with IR (although not of a golf ball core or cover).

The present invention provides a novel methodology in the use of rubbers, curing agents and high temperature peroxides in normal formulations, in such a way that they will not fully cure when molded, but will more fully cure when exposed to infrared radiation. Preferably, they will then be more fully cured only at the first several mils on the surface of the golf ball core/air interface. This results in a highly cross-linked surface and a soft center. This may be completed in a short time span, i.e. 5 minutes if by infrared radiation. The core having been molded, the structural framework will stay intact. The outside core surface will experience high (175–300° C.) temperatures.

The present invention, as described in FIG. 1, includes a golf ball 10 as manufactured having a core 11 comprising a thermosetting composition having an outer layer (shell) 12 of about 0.001 to 0.050 inches that has a considerably different hardness than any other portion of the core 11. Most preferred is a hard shell 12 over a soft core 11 or core layer. The hard shell 12, soft interior is accomplished via infrared heating of a pre-molded core 11. Alternatively, a soft skin over a hard core can be accomplished by infrared heating, wherein the heating degrades or otherwise softens the skin of the pre-molded core.

The following terms are used in this application. Shore D and C Harnesses are measured by the ASTM method D-2240. "Compression points" refer to the compression scale or the compression scale based on the ATTI Engineering Compression Tester. This scale, which is well known to those working in this field, is used in determining the relative compression of a core or ball. The compression is measured by applying a spring-loaded force to the golf ball center, golf ball core or the golf ball to be examined, with a manual instrument manufactured by the Atti Engineering Company of Union City, N.J. This machine, equipped with a Federal Dial Gauge, Model D81-C, employs a calibrated spring under a known load. The sphere to be tested is forced a distance of 0.2 inch against this spring. If the spring, in turn, compresses 0.2 inch, the compression is rated at 100; it the spring compresses 0.1 inch, the compression value is rated as 0. Thus more compressible, softer materials will have a lower Atti gauge values than harder, less compressible materials. Compression measured with this instrument is also referred to as PGA compression.

As used herein, "COR" refers to Coefficient of Restitution, which is obtained by dividing a ball's rebound velocity by its initial (i.e. incoming) velocity. This test is performed by firing the samples out of an air cannon at a vertical steel plate over a range of test velocities (from 75 to 150 ft./sec). A golf ball having a high COR dissipates a smaller fraction of its total energy when colliding with the plate and rebounding therefrom than does a ball with a lower COR. Unless otherwise noted, the COR values reported herein are the values determined at an incoming velocity of 125 ft./sec.

The term "about," as used herein in connection with one or more numbers or numerical ranges, should be understood to refer to all such numbers, including all numbers in a range.

As used herein, the term "pph" in connection with a batch formulation refers to parts by weight of the constituent per hundred parts of the base composition.

An embodiment of the invention, shown in FIG. 1, employs a one piece core 11 (up to a diameter of about 1.65 inches) having a cure gradient created by infrared radiation, such that the skin 12 of the core 11 has a Shore D hardness of greater than 50, preferably greater than 60, and a core 11 that is softer than the skin 12 by at least 3 Shore D points and preferably at least 5. The skin 12 of the core 11 will further have a Shore A hardness of about 80A and preferably greater than 95A. The gradient can be achieved to a pre-desired depth by controlling the time and temperature of the radiation being applied. The use of various formulation modifications may exploit the infrared heating such as selective use of curatives or higher concentrations of curatives or reactants at or near the surface of the core 11.

Figure 2:
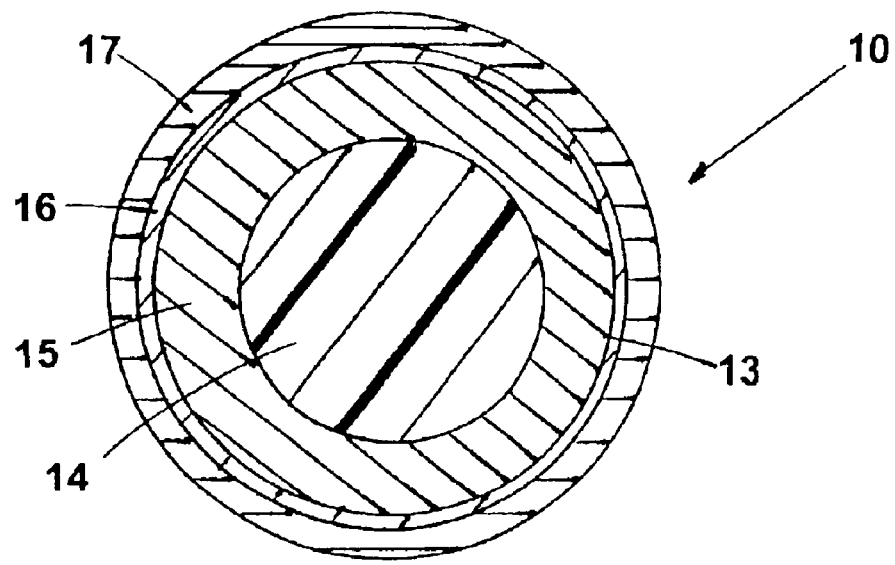
FIG. 2 is a cross section of a multi-layered core with the outer layer forming the hardness gradient.

In another embodiment, shown in FIG. 2, the invention is a golf ball 10 comprised of a multi-layer core 13. The core 13 is comprised of a center 14 and at least one outer core layer 15 covering the center 14, wherein the outer core layer 15 is formed on the center 14 wherein a hardness gradient is formed on the skin 16 by infrared heating. A cover 17 completes the ball construction. In a preferred embodiment, a soft center is formed and a harder layer is formed over the center. Then, an outer layer is formed on the surface of the harder layer such that the outer layer is at least 3 Shore D points harder than the harder layer, and preferably 5 Shore D points harder. Preferably, the center has a diameter of at least 0.75 to 1.5 inches and the harder layer has an outer diameter of about 1.5 to 1.65 inches. The outer layer preferably has a thickness of about 0.01 to 0.05 inches. Overall, the core preferably has an Atti compression of about 40 to 100.

The IR oven uses infrared radiation to provide high levels of temperatures (from less than 350° F. to about 2000° F.) to the surface and underlying mils of a golf ball core 11. This radiation exposes these outer regions of the core to a higher temperature than the center of the core, therein creating a gradient. The time of exposure and temperature of the oven will provide the depth and degree of curing. Several approaches may be used to create the gradient.

The principles of curing with IR would work equally as well with one-piece, two-piece, multi-core, or multi-cover layered golf balls. Infrared radiation can be used to cross-link any portion of a golf ball, including the cover, coating and any intermediate layer as well as a core layer.

In one embodiment, a core is cured as done in the usual manufacturing process, which is a reasonably full cure. Then, the core is exposed to IR radiation to potentially further harden its skin or shell. The core composition can be made from any suitable core materials including thermoset polymers, such as natural rubber, ethylene propylene rubber or epdiene monomer, polybutadiene (PBD), polyisoprene, styrene-butadiene or styrene-propylene-diene rubber, and thermoplastics such as ionomer resins, polyamides, polyesters, or a thermoplastic elastomer. Suitable thermoplastic elastomers include Pebax®, which is believed to comprise polyether amide copolymers, Hytrel®, which is believed to comprise polyether ester copolymers, thermoplastic urethane, and Kraton®, which is believed to comprise styrenic block copolymers elastomers. These products are commercially available from Elf-Atochem, E. I. Du Pont de Nemours and Company, various manufacturers, and Shell Chemical Company, respectively. The core materials can also be formed from a castable material. Suitable castable materials include those comprising a urethane, polyurea, epoxy, silicone, IPN's, etc.

The polybutadiene rubber composition preferably includes between about 2.2 parts and about 5 parts of a halogenated organosulfur compound. The halogenated conventional materials for such cores include core compositions having a base rubber, a cross-linking agent, filler and a co-cross-linking agent. The base rubber typically includes natural or synthetic rubbers. A preferred base rubber is 1,4-polybutadiene having a cis-structure of at least 40%. Natural rubber, polyisoprene rubber and/or styrene-butadiene rubber may be optionally added to the 1,4-polybutadiene. The initiator included in the core composition can be any known polymerization initiator that decomposes during the cure cycle. The cross-linking agent includes a metal salt of an unsaturated fatty acid such as a zinc salt or a magnesium salt of an unsaturated fatty acid having 3 to 8 carbon atoms such as acrylic or methacrylic acid. The filler typically includes materials such as tungsten, zinc oxide, barium sulfate, silica, calcium carbonate, zinc carbonate and the like. The polybutadiene rubber composition preferably includes between about 2.2 parts and about 5 parts of a halogenated organosulfur compound. The halogenated organosulfur compound may include pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; and their zinc salts, the metal salts thereof, and mixtures thereof, but is preferably pentachlorothiophenol or the metal salt thereof. The metal salt may be zinc, calcium, potassium, magnesium, sodium, and lithium, but is preferably zinc.

Additionally, suitable core materials may also include cast or reaction injection molded polyurethane or polyurea, including those versions referred to as nucleated, where a gas, typically nitrogen, is incorporated via intensive agitation or mixing into at least one component of the polyurethane. (Typically, the pre-polymer, prior to component injection into a closed mold where essentially full reaction takes place resulting in a cured polymer having reduced specific gravity.) These materials are referred to as reaction injection molded (RIM) materials. Alternatively, the core may have a liquid center.

In another embodiment the core formulation is developed such that the core may be under-cured yet reacted enough to produce a core having a reasonable compression and COR value. Then the core is exposed to IR such that only the outer skin or shell is fully (or nearly fully cured).

In yet another embodiment, the core is compounded comprising a material that will only be reactive at a temperature produced by the IR such that the reaction depth is controlled. An example of this would be where a blocked-reactive material is compounded into the entire core, but only that portion which is exposed to the high temperature IR will react, and this depth is controlled by time/temperature.

In still another embodiment the core is compounded comprising of a component that will soften (via degradation, chain scission, etc) upon exposure to IR. The core will first cure to a desired compression and COR value, and then, in a post molding IR treatment, the skin or surface of the core will be altered.

Another embodiment presents a molded core that is partially or even fully cured, then is treated (sprayed, dipped, impregnated, dusted, impinged, etc.) with a material that will only react upon IR exposure thereby altering the core surface properties.

It is to be appreciated that butyl rubbers can be cured by a number of curing agents. Preferred curing agents for golf ball usage include sulphur for butyl rubber, and a peroxide curing agent, preferably zinc peroxide, for halogenated butyl rubbers. Other suitable curing agents may include antimony oxide, lead oxide or lead peroxide. Lead based curing agents may be used when appropriate safety precautions are implemented. Butyl rubbers are commercially available in various grades from viscous liquid to solids with varying the degree of unsaturation and molecular weights. Latex grades are also available.

Golf balls having a mantle layer may have the mantle layer cured by IR. The mantle layer may be formulated wherein the mantle layer comprises of dynamically vulcanized thermoplastic elastomer, functionalized styrene-butadiene elastomer, thermoplastic polyurethane or metallocene polymer or blends thereof. Suitable dynamically vulcanized thermoplastic elastomers include Santoprene®, Sarlink®, Vyram®, Dytron® and Vistaflex®. Santoprene® is the trademark for a dynamically vulcanized PP/EPDM. Santoprene® 203-40 is an example of a preferred Santoprene® and is commercially available from Advanced Elastomer Systems. Examples of suitable functionalized styrene-butadiene elastomers include Kraton FG-1901x and FG-1921x, which is available from the Shell Corporation. Examples of suitable thermoplastic polyurethanes include Estane® 58133, Estane® 58134 and Estane® 58144, which are commercially available from the B. F. Goodrich Company. Suitable metallocene polymers whose melting points are higher than the cover materials can also be employed in the mantle layer of the present invention. Further, the materials for the mantle layer described above may be in the form of a foamed polymeric material. For example, suitable metallocene polymers include foams of thermoplastic elastomers based on metallocene single-site catalyst-based foams. Such metallocene-based foam resins are commercially available from Sentinel Products of Hyannis, Mass. Suitable thermoplastic polyetheresters include Hytrel® 3078, Hytrel® 3548, Hytrel® 4078, Hytrel® 4069, Hytrel® 6356, Hytrel® 7246, and Hytrel® 8238 which are commercially available from DuPont. Suitable thermoplastic polyetheramides include Pebax® 2533, Pebax® 3533, Pebax® 4033, Pebax® 5533, Pebax® 6333, and Pebax® 7033 which are available from Elf-Atochem. Suitable thermoplastic ionomer resins include any number of olefinic based ionomers including SURLYN® and Iotek®, which are commercially available from DuPont and Exxon, respectively. The flexural moduli for these ionomers is about 1000 psi to about 200,000 psi. Suitable thermoplastic polyesters include polybutylene terephthalate. Likewise, the dynamically vulcanized thermoplastic elastomers, functionalized styrene-butadiene elastomers, thermoplastic polyurethane or metallocene polymers identified above are also useful as the second thermoplastic in such blends. Further, the materials of the second thermoplastic described above may be in the form of a foamed polymeric material.

Such thermoplastic blends comprise about 1% to about 99% by weight of a first thermoplastic and about 99% to about 1% by weight of a second thermoplastic. Preferably the thermoplastic blend comprises about 5% to about 95% by weight of a first thermoplastic and about 5% to about 95% by weight of a second thermoplastic. In a preferred embodiment of the present invention, the first thermoplastic material of the blend is a thermoplastic polyetherester, such as Hytrel®.

The present invention also contemplates the use of a variety of non-conventional cover materials. In particular, the covers of the present invention may comprise thermoplastic or engineering plastics such as ethylene or propylene based homopolymers and copolymers including functional monomers such as acrylic and methacrylic acid and fully or partially neutralized ionomers and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), reinforced engineering plastics, acrylonitrile-butadiene, acrylic-styrene-acrylonitrile, poly(ethylene terephthalate), poly(butylene terephthalate), poly(ethylene-vinyl alcohol), poly (tetrafluoroethylene) and their copolymers including functional comonomers and blends thereof. These polymers or copolymers can be further reinforced by blending with a wide range of fillers and glass fibers or spheres or wood pulp.

Additional preferred cover materials include thermoplastic or thermosetting polyurethane, such as those disclosed in U.S. Pat. Nos. 6,371,870; 6,210,294; 6,193,619; 5,908,358; 5,692,974; and 5,484,870; and metallocene or other single site catalyzed polymers such as those disclosed in U.S. Pat. Nos. 5,824,746; 5,703,166; 6,150,462; and 5,981,658.

While it is apparent that the illustrative embodiments of the invention herein disclosed fulfills the objectives stated above, it will be appreciated that numerous modifications and other embodiments may be devised by those skilled in the art. Therefore, it will be appreciated that the appended claims are intended to cover all such modifications and embodiments which come within the spirit and scope of the present invention.

What is claimed is:

1. A golf ball comprising:
    a thermoset material formed into pre-molded core;
    the pre-molded core including an outer layer gradient coated by infrared radiating curing of 0.001 to 0.050 inches thick;
    the outer layer gradient having a shore D hardness of at least 3 points different from a portion of the core not subject to infrared curing; and
    a cover disposed about the core.

2. The golf ball of claim 1, wherein infrared curing of the pre-molded core comprises heating to temperatures from about 350° F. to about 2000° F.

3. The golf ball of claim 1, wherein the outer layer gradient has a Shore D hardness of greater than 50 and the remainder of the pre-molded core has a Shore D hardness of at least about 3 points lower.

4. The golf ball of claim 1, wherein the outer layer gradient has a Shore D hardness of greater than 60 and the remainder of the pre-molded core has a Shore D hardness of at least about 3 points lower.

5. The golf ball of claim 1, wherein the outer layer gradient is made softer than the remainder of the pre-molded core by degrading an outer skin of the pre-molded core.

6. The golf ball of claim 5, wherein the outer skin degrading is caused by the pre-molded core being treated with a material that will react upon infrared radiation exposure.

7. The golf ball of claim 5, wherein the outer skin degrading is caused by compounding the pre-molded core with a material that will degrade upon exposure to infrared radiation.

* * * * *